April 9, 1963  C. E. JOSLIN  3,084,494
SAFETY DEVICE FOR MOWERS
Filed May 11, 1961

INVENTOR.
CARLOS E. JOSLIN
BY
Schmieding and Fultz
ATTORNEYS 3,084,494
SAFETY DEVICE FOR MOWERS
Carlos Earl Joslin, Clark St., Mount Sterling, Ohio
Filed May 11, 1961, Ser. No. 109,309
6 Claims. (Cl. 56—25.4)

This invention relates to rotary cutter type mowing machines.

In general it is the purpose of the present invention to provide a safety-type access door for the cutter housings of large mowers such as the type that are mounted on or pulled by tractors. Mowers of this type include a housing that overlies and surrounds the periphery of one or more rotary cutter blades.

The access door of the present invention is pivotally mounted on the top wall of the cutter housing and a resilient steel wire is mounted on the access door and extended within the cutter housing such that when the door is opened the resilient wire is swung downwardly into the path of the cutter blade. If the machine is running the whirling cutter blade will strike the resilient wire and create a noise that warns the operator not to reach through the access door and into the path of the whirling cutter.

It is therefore the object of the present invention to provide a novel safety type access door for cutter housings of rotary type mowers.

Further objects and advantages of the present invention will be apparent from the following description, reference being had to the accompanying drawings wherein a preferred form of embodiment of the invention is clearly shown.

Figure 1:
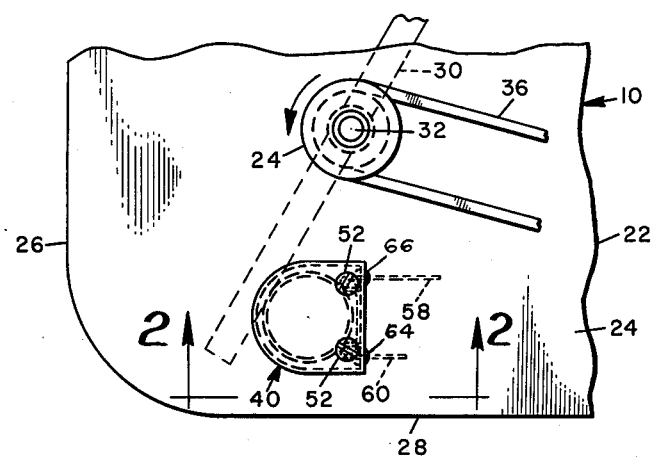
FIG. 1 is a partial plan view of a rotary mower housing to which the safety device of the present invention has been applied.

Referring in detail to the drawings, a mower constructed according to the present invention is indicated generally at 10 and comprises a cutter housing 22 provided with a top wall 24, a front wall 26, and a side wall 28.

A rotary cutter blade 30 is mounted on a drive shaft 32 journaled on cutter housing 22. A pulley 24 is keyed to drive shaft 32 and is connected to a prime mover, not illustrated, by the belt 36.

The top wall 24 of housing 22 includes an access opening 38 through which the operator can reach into the housing.

It should be pointed out that access openings of this type are necessary on large tractor mounted mowing machines where it is impractical, due to the weight of the machine, to turn the mower on its side to gain access to the interior of the housing.

An access door, indicated generally at 20, is pivotally mounted to the top wall of the housing by a resilient wire member 44 that includes vertical portions 42 that extend downwardly through holes 64 in top wall 24 of the housing.

The purpose of door 20 is to provide access to blade 30 so that the operator can remove the blade without turning the machine upsidedown. The door also provides means for removing entangled weeds and debris from blade 30.

Figure 3:
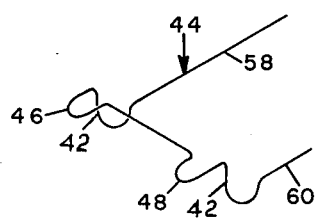
FIG. 3 is a perspective view of a resilient wire comprising a portion of the safety device of the preceding figures.

Resilient wire member 44 is bent to the configuration shown in FIG. 3 and includes spaced U-shaped sections 46 and 48 through which shanks 50 of bolts 52 are extended. Nuts 54 on bolts 52 serve to clamp U-shaped portions 46 and 48 of wire member 44 against the under side 56 of access door 20.

Figure 2:
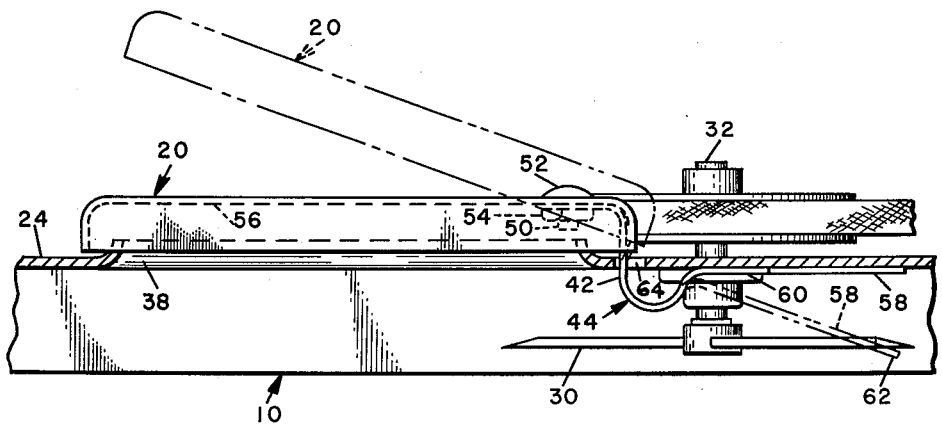
FIG. 2 is an enlarged side sectional view of the apparatus of FIG. 1, the section being taken along the line 2—2 of FIG. 1.

Resilient wire member 44 also includes legs 58 and 60 which, when the door is in its closed position, extend horizontally above the plane of rotation of cutter blade 30 as is illustrated in solid deliniation in FIG. 2. When, however, access door 20 is moved to the open position illustrated by dotted deliniation in FIG. 2 the lower end of leg 58 is moved into the plane of rotation of cutter 30. If the cutter is in motion it will strike leg 58 and make a loud chattering noise that warns the operator not to extend his hand downwardly through access opening 38.

It should be pointed out that the free end 62 of leg 58 extends in the direction of rotation of cutter 30 whereby it is merely deflected upwardly when it is struck by the rotating blade.

While the form of embodiment of the present invention as herein disclosed constitutes a preferred form, it is to be understood that other forms might be adopted, all coming within the scope of the claims which follow.

I claim:

1. A mowing machine comprising, in combination, cutter housing means including an access opening; cutter means rotatably disposed within said housing means; a normally closed door for said access opening; and a member movable into the path of movement of said cutter means responsive to opening of said door.

2. The apparatus defined in claim 1 wherein said member is formed of resilient wire.

3. A mowing machine comprising, in combination, cutter housing means including an access opening; cutter means, rotatably disposed within said housing means; a normally closed door for said access opening; and a member mounted to said door and movable from a closed door postion outside the path of movement of said cutter means to an open door position within said path responsive to opening of said door.

4. The apparatus defined in claim 3 wherein said member is formed of resilient wire.

5. A mowing machine comprising, in combination, cutter housing means including an access opening; cutter means rotatably disposed within said housing means; a normally closed door for said access opening; and a member mounted on said door, said member including a portion extending downwardly through said hole and a portion extending rearwardly and above the path of said cutter means when said door is closed, said second portion of said member being movable into said path by opening of said door.

6. The apparatus defined in claim 5 wherein said member is formed of resilient wire.

References Cited in the file of this patent
UNITED STATES PATENTS

| | | |
|---|---|---|
| 2,720,071 | Watanabe | Oct. 11, 1955 |
| 2,742,751 | Laughlin | Apr. 24, 1956 |
| 2,861,611 | Considder | Nov. 25, 1958 |
| 2,953,888 | Phillips et al. | Sept. 27, 1960 |
| 2,984,961 | Judkins | May 23, 1961 |